United States Patent [19]
Edelman et al.

[11] 3,950,590
[45] Apr. 13, 1976

[54] PRODUCTION OF IMPROVED POLYESTER FIBERS FOR USE IN TIRES

[75] Inventors: Robert Edelman, Staten Island, N.Y.; Michael M. Besso, West Orange, N.J.

[73] Assignee: Celanese Corporation, New York, N.Y.

[22] Filed: June 24, 1974

[21] Appl. No.: 482,534

[52] U.S. Cl. ............ 428/395; 156/110 A; 156/331; 260/29.2 TN; 427/390; 427/412; 428/425; 428/480
[51] Int. Cl.² B32B 25/08; B32B 27/36; B32B 27/40
[58] Field of Search ....... 156/331, 110 A; 117/76 T, 117/138.8 F; 260/29.2 TN; 427/412, 390; 428/201, 354, 246, 265, 395, 424, 425, 480

[56] References Cited
UNITED STATES PATENTS

| | | | |
|---|---|---|---|
| 3,179,547 | 4/1965 | Kigane et al. | 117/76 T X |
| 3,240,659 | 3/1966 | Atwell | 156/331 X |
| 3,294,724 | 12/1966 | Axelrood | 260/29.2 TN |
| 3,552,999 | 1/1971 | Shima et al. | 117/76 T |
| 3,565,844 | 2/1971 | Grace et al. | 260/29.2 TN |
| 3,748,291 | 7/1973 | Bhakuni et al. | 156/331 X |

*Primary Examiner*—Ralph Husack

[57] ABSTRACT

A procedure is provided for enhancing the thermal stability of a multifilament polyester fibrous material during use when incorporated in a rubber tire matrix. A non-uniform deposition of a polyether urethane polymer (as defined) is provided upon at least the outer surface of the polyester fibrous material intermediate the conventional inner coating of fiber finish and the conventional outer coating of adhesive. The preformed polyether urethane polymer is applied from an aqueous dispersion of the same (as described), and is deposited in a concentration of about 1 to 6 percent by weight of the resulting fibrous material. The enhanced thermal stability of the resulting polyester fibrous material conveniently may be demonstrated by a determination of the strength retention of the same following subjection to heat while incorporated in a rubber matrix.

11 Claims, 1 Drawing Figure

PRODUCTION OF IMPROVED POLYESTER FIBERS FOR USE IN TIRES

BACKGROUND OF THE INVENTION

Heretofore multifilament polyester fibrous materials have achieved widescale acceptance as a fibrous reinforcing medium when incorporated in a rubber matrix of vehicle (e.g. automobile) tires. For instance, polyethylene terephthalate tire cords are recognized to impart smoother ride characteristics when compared to rubber tires which incorporate nylon tire cords and which have a tendency at least initially to produce pavement pounding particularly in cold weather.

Customarily a conventional fiber finish and a conventional adhesive are applied to the multifilament fibrous materials prior to incorporation in the rubber tire matrix.

It has been recognized, however, that polyester tire cords have a tendency to be adversely influenced by heat during extended use and to exhibit a substantial drop in strength retention. Accordingly, rubber tires which incorporate polyester tire cords have been used almost exclusively on automobiles, and have been largely avoided for use on heavy duty trucks.

It is an object of the present invention to provide improved polyester fibers for use as a reinforcing medium in rubber tires.

It is an object of the present invention to provide improved polyester fibers which exhibit enhanced chemical stability when incorporated in a rubber matrix at an elevated temperature.

It is an object of the present invention to provide improved polyester fibers for incorporation in rubber tires which offer a greater margin of safety under severe operating conditions (e.g. highly elevated operating temperatures).

It is another object of the present invention to provide a simple and inexpensive treatment process for polyester fibers intended for incorporation in rubber tires which is capable of decreasing the degradation of the same under use conditions.

It is a further object of the present invention to provide a process for the treatment of polyester fibers for use in tires which is capable of extending the useful life of the same during tire use.

These and other objects of the invention will be apparent to those skilled in the art from the following description.

SUMMARY OF THE INVENTION

It has been found that in a process for the surface preparation of a multifilament polyester fibrous material for incorporation in a rubber tire matrix wherein a fiber finish initially is applied and an adhesive coating subsequently is applied; improved results are achieved by treating the multifilament fibrous material subsequent to the application of the fiber finish and prior the application of the adhesive coating whereby the thermal stability thereof is enhanced during use by:

a. contacting the fibrous material with an aqueous dispersion of a polyether urethane polymer having recurring units of the formula:

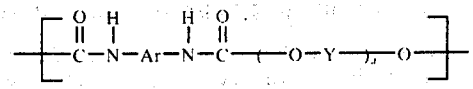

where Ar is an arylene group, Y is selected from the group consisting essentially of an arylene group, a branched chain alkylene group having 2 to 4 carbon atoms, a non-branched chain alkylene group having 2 to 4 carbon atoms, and mixtures of the foregoing, and $x =$ about 4 to 25, with the polyether urethane polymer being present in the aqueous dispersion in a concentration of about 5 to 25 percent by weight whereby at least the outer surface of said fibrous material is coated with the aqueous dispersion, and b. drying the fibrous material bearing the aqueous dispersion in a gaseous atmosphere until the water component of the dispersion substantially is evolved and a non-uniform deposition of the polyether urethane polymer upon at least the outer surface of the fibrous material is accomplished in a concentration of about 1 to 6 percent by weight of the resulting fibrous material.

An improved multifilament polyester fibrous material for incorporation in a rubber tire matrix is provided which bears a non-uniform deposition of polyether urethane polymer having recurring units of the formula:

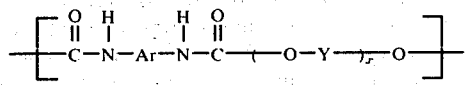

where Ar is an arylene group, Y is selected from the group consisting essentially of an arylene group, a branched chain alkylene group having 2 to 4 carbon atoms, a non-branched chain alkylene group having 2 to 4 carbon atoms, and mixtures of the foregoing, and $x =$ about 4 to 25, intermediate an inner coating of fiber finish and an outer coating of adhesive, with said polyether urethane polymer being present in a concentration of about 1 to 6 percent by weight of the resulting fibrous material and serving to enhance the thermal stability thereof during use.

DESCRIPTION OF THE DRAWING

The drawing is a photograph made with the aid of a scanning electron microscope at a magnification of 450X of a representative portion of a polyethylene terephthalate tire cord upon which a non-uniform deposition of the polyether urethane polymer has been deposited in accordance with the present invention. The polyether urethane polymer is visible as a non-uniform coating upon the surface of the multifilament fiber bundle and was applied subsequent to the application of a fiber finish which is not visible in the photograph. The polyether urethane coating tends to be preferentially deposited in the crevices between adjoining filaments. The conventional adhesive has not yet been applied to the tire cord of the drawing. The polyether urethane polymer is present upon the tire cord in a concentration of about 3.25 percent by weight based upon the weight of the fibrous material prior to the application of the adhesive.

DESCRIPTION OF PREFERRED EMBODIMENTS

The multifilament polyester fibrous material which is surface treated in accordance with the present invention may be provided as a continuous length in any one of a variety of physical configurations and may be formed in accordance with fiber-forming techniques known in the art, e.g. via melt-spinning followed by hot drawing.

The multifilament polyester fibrous material may be principally polyethylene terephthalate, and contain at least 85 mol percent polyethylene terephthalate, and preferably at least 90 percent polyethylene terephthalate. In a particularly preferred embodiment the polyester fibrous material is substantially all polyethylene terephthalate. Alternatively, during the preparation of the polyester minor amounts of one or more ester-forming ingredients other than ethylene glycol and terephthalic acid or its derivatives may be copolymerized. For instance, the polyester may contain 85 to 100 mol percent (preferably 90 to 100 mol percent) polyethylene terephthalate structural units and 0 to 15 mol percent (preferably 0 to 10 mol percent) copolymerized ester units other than polyethylene terephthalate. Illustrative examples of other ester-forming ingredients which may be copolymerized with the polyethylene terephthalate units include glycols such as diethylene glycol, tetramethylene glycol, hexamethylene glycol, etc., and dicarboxylic acids such as hexahydroterephthalic acid, bibenzoic acid, adipic acid, sebacic acid, azelaic acid, etc.

The multifilament polyester fibrous material is composed of a plurality of substantially parallel continuous filaments which possess the configuration of a yarn, strand, cord, etc. Conventional polyester tire cords may serve as the starting material. Representative tire cords utilize yarns having a denier of about 750 to 2000 (e.g. 1000 to 1300), and are composed of 2 to 5 yarn plies (e.g. 2 or 3 plies) of about 150 to 250 filaments (e.g. 180 to 200 filaments). The filaments of the individual yarn bundles commonly are twisted in one direction (e.g. the Z direction) and when plied the plies are twisted in the opposite direction (e.g. in the S direction). For instance, representative tire cords of 1000/2 (11 × 11) or 1300/3 (8 × 8), etc. may be utilized. Alternatively, the multifilament fibrous material may consist of a simple yarn or ply which may be twisted or untwisted (e.g. a yarn of 150 to 250 filaments). Such yarns subsequently may be combined to form a fiber assemblage of a greater total denier prior to incorporation in a rubber tire. The exact physical configuration of the multifilament polyester fibrous material at the time of its surface preparation in accordance with the present invention is not critical to the achievement of improved thermal stability results discussed hereafter. Any multifilament polyester fibrous material intended for incorporation in a rubber matrix of a tire can experience an enhancement of its in-rubber chemical stability in a heated environment when treated in accordance with the present invention.

A fiber finish initially is applied to the multifilament polyester fibrous material. The fiber finish may be applied in accordance with conventional techniques and serves to facilitate ready handling of the same via the compaction of the individual filaments and the lubrication of the same. If desired, the finish may be applied to the as-spun fibrous material with a kiss roll or a metered finish applicator prior to take-up and prior to hot drawing. The lubricating function of the finish facilitates the stable hot drawing of the as-spun fibrous material. Any finish may be selected which has been used in the fiber industry as a lubricant to minimize friction between filaments and hot drawing equipment. Generally the finish comprises a lubricating oil, an antistatic agent, and an emulsifier. Representative lubricating oils are palm oil, coconut oil, cottonseed oil, mineral oil, glycerides, polyglycol esters, butyl stearate, octyl stearate, esters of oleic acid, trimethylol propane/caprylic acid esters, 2-methyl-2-propyl-propane diol-1,3-dilaurate and 2-ethyl-2-butyl-propane diol-1,3-dilaurate. The lubricant commonly is dispersed in water with the aid of a surfactant such as a sulfonated aromatic petroleum hydrocarbon, a polyoxyethylene ester or ether, a polyglycerol ester, etc. The finish also may contain an antistatic agent to reduce the electrostatic charge of the fibrous material during processing. Representative antistatic agents include ethoxylated amides, polyglycerol esters, polyoxy (ethylene or propylene) mono-alkyl ethers, phosphate esters, long chain phosphates, phosphonates and other oxygenated phosphorus derivatives, etc. If desired, water-miscible organic solvents such as benzene may be included in the finish composition. Commonly, the finish is present upon the multifilament fibrous material in a concentration of about 0.3 to 1.0 percent by weight immediately following application of the finish composition and the volatilization of the water and/or other dispersing medium.

The multifilament polyester fibrous material subsequently is contacted with an aqueous dispersion of a polyether urethane polymer having recurring units of the formula:

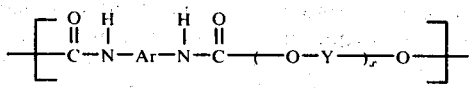

where Ar is an arylene group, Y is selected from the group consisting essentially of an arylene group, a branched chain alkylene group having 2 to 4 carbon atoms, a non-branched chain alkylene group having 2 to 4 carbon atoms, and mixtures of the foregoing, and $x =$ about 4 to 25, with the polyether urethane polymer being present in the aqueous dispersion in a concentration of about 5 to 25 percent by weight whereby at least the outer surface of the fibrous material is coated with the aqueous dispersion.

The polyether urethane polymer may be formed by the reaction of one or more arylene diisocyanate and a polyarylene ether glycol or a polyalkylene ether glycol, or mixtures thereof. The arylene diisocyanate optionally may be present in combination with one or more aliphatic substituent groups which are joined to one or more aromatic rings. Representative arylene diisocyanates include: 2,4-tolylene diisocyanate, 2,6-tolylene diisocyanate, 4,4'-diphenylmethane diisocyanate, 2,4-naphthalene diisocyanate, 2,6-naphthalene diisocyanate, m-phenylene diisocyanate, naphthylene-1,5-diisocyanate, 1-methoxyphenyl-2,4-diisocyanate, 4,4'-biphenylene diisocyanate, 3,3'-dimethyldiphenyl-4,4'-diisocyanate, p-phenylene diisocyanate, 1-chloro-2,4-phenylene diisocyanate, 4,4'-bis(2-methylisocyanotophenyl) methane, 4,4'-bis(2-methoxyisocyanotophenyl) methane, etc., and mixtures thereof. For instance, a mixture of 80 parts by weight 2,4-tolylene diisocyanate and 20 parts by weight 2,6-tolylene diisocyanate conveniently may be utilized. Alternatively, 65:35 mixtures of the same compounds conveniently may be selected.

Suitable polyalkylene ether glycols for use in the formation of the polyether urethane polymer include the branched chain and non-branched chain alkylene groups of 2,3 or 4 carbon atoms, or mixtures thereof. The preferred polyalkylene ether glycols include branched chain alkylene groups of 2,3 or 4 carbon atoms. Particularly preferred branched chain polyalkylene ether glycols contain 2 or 3 carbon atoms, e.g. poly-1,2-oxypropylene glycol. The polyalkylene ether glycols may be prepared by known techniques and possess a molecular weight of about 200 to 1500, and most preferably a molecular weight of about 250 to 670. The polyalkylene ether glycols commonly are base catalyzed polymers of an oxide, such as ethylene oxide, propylene oxide, or butylene oxide, using a glycol as initiator when non-branched chain polyether glycols are formed and polyols of greater functionality when branched chain polyether glycols are formed. The polyarylene ether glycols may be formed by a similar reaction, e.g. the 1,2-propylene oxide addition product of Bisphenol A, and the 1,2-propylene oxide addition product of xylene diol. The relative quantities of the arylene diisocyanate and polyarylene ether glycol and/or polyalkylene ether glycol reactants are such that molar quantities of the same commonly range from about 1.3:1 to about 2:1.

The reaction of the arylene diisocyanate and the polyarylene ether glycol and/or polyalkylene ether glycol to form the polyether urethane polymer may be carried out in accordance with known techniques in the presence or absence of a solvent. For instance, the reaction may be carried out in the presence of an organic solvent having a boiling point above 80°C. Any solvent may be selected in which the reactants are soluble and which does not interfere with the desired urethane-forming reaction. Particularly preferred organic solvents are hydrocarbons such as benzene and toluene. Approximately 25 to 400 parts of solvent may be provided per 100 parts of polyarylene ether glycol and/or polyalkylene ether glycol reactant. The reactants and solvent may be agitated while at a temperature of about 70° to 90°C. A catalyst, such as a tertiary amine or a tin compound (e.g. dibutyltin dilaurate), optionally may be present. The reaction is conducted until the reaction of substantially all of the hydroxyl groups of the polyalkylene ether glycol is complete. If a catalyst is employed reaction temperatures below 60°C. for about 10 minutes to 3 hours may be selected. Longer reaction times of about 2 hours to 2 days commonly are required if no catalyst is present.

The resulting prepolymer which commonly has isocyanate end groups next may be added to an aqueous solution of a nonionic or anionic surfactant, e.g. polyoxyethylene glycol or an alkali metal salt of a high molecular weight organic acid, and subjected to vigorous agitation (e.g. with a paddle type agitator). For instance, about 2 to 6 percent by weight of the surfactant based upon the weight of the prepolymer forms a stable emulsion. A conventional chain extending agent may be added to the resulting dispersion of the prepolymer and the molecular weight thereof increased through the combination of polymer molecules. Alternatively, the chain extending agent may be dissolved in water and added to the reaction medium containing the prepolymer, and a surfactant. The hydrogen on the ends of the chain extending agent reacts preferentially with the isocyanate groups of the prepolymer much more readily than the hydrogen contained in the water molecules, thus the chain is extended even though the reaction takes place in an aqueous medium. Preferably about 1.0 equivalent of chain extending agent is provided for each isocyanate equivalent. Primary and secondary diamines may serve as preferred chain extending agents and result in the introduction of urea groups (i.e. either plain or substituted) within the molecule of the polyether urethane polymer. Preferred primary diamines include: phenylene diamine, 1,4-cyclohexane bis(methylamine), etc. Preferred secondary diamines include: 2-methyl piperazine, piperazine, N,N'-di(2-hydroxypropyl) ethylenediamine, etc. A preferred mixed primary and secondary diamine is N-(2-hydroxypropyl) ethylenediamine. Following chain extension the polyether urethane polymer commonly has an average molecular weight of about 50,000 to 100,000. Representative procedures for forming the polyether urethane polymer are disclosed in U.S. Pat. Nos. 3,294,724 and 3,565,844.

If desired, polyether urethane polymer dispersions suitable for use in the present invention following dilution may be commercially obtained from the BSAF Wyandotte Corporation under the designation X-1033G and X-1042 urethane latices.

The polymer concentration of the aqueous dispersion is adjusted so that the polyether urethane polymer is present therein in the desired concentration of about 5 to 25 percent by weight, and preferably in a concentration of about 6 to 10 percent by weight. The stability of the aqueous dispersion preferably is maintained through the presence of a nonionic or anionic surfactant in a concentration of about 1 to 2 percent by weight. Representative surfactants include: polyoxyethylene glycol, polyoxyethylenepolypropylene glycol, polyethylene glycol ethers of long chain alcohols, alkali metal salts of high molecular weight organic acids, salts of alkyl or alkylaryl sulfonic acids, etc. If desired, a residual quantity of the organic solvent utilized during the formation of the polyether urethane prepolymer, e.g. up to about 10 percent by weight, may be present in the aqueous dispersion which is contacted with the multifilament polyester fibrous material without deleterious results.

The contact between the fibrous material and the aqueous dispersion of polyether urethane polymer may be conducted by any one of a variety of techniques provided the coating of at least the outer surface of the same results. For instance, the coating may be conducted by dipping, spraying, contact with transfer rolls, etc. Conventional equipment commonly utilized for adhesive application to a tire cord may be employed to apply the dispersion of polyether urethane polymer. The contact may be carried out on a batch basis wherein the fibrous material statically is positioned within the coating zone while present on a support or on a continuous basis wherein the fibrous material continuously is passed through the coating zone. In a preferred coating technique the fibrous material continuously is passed through a vessel containing the aqueous dispersion of polyether urethane polymer. At the time of the contact the aqueous dispersion of polyether urethane polymer preferably is maintained at a temperature of about 15 to 35°C., and the fibrous material contacted therewith for a residence time of about 0.2 to 2 seconds. The dispersion of polyether urethane polymer preferably is continuously stirred prior to coating. The degree of polymer coating is influenced by the concentration of the dispersion and the contact residence time as will be apparent to those skilled in the art.

The fibrous material bearing the aqueous dispersion next is dried in a gaseous atmosphere until the water component of the same substantially is evolved and a non-uniform deposition of polyether urethane polymer upon at least the outer surface thereof is accomplished in a concentration of about 1 to 6 percent by weight of the surface prepared product, and most preferably in a concentration of about 1 to 4 percent by weight. If the deposition is much less than about one percent by weight, the desired improvement in thermal stability during use does not result. The gaseous atmosphere preferably is air; however, any gaseous atmosphere may be selected which does not deleteriously influence the fibrous material during the drying treatment. The gaseous atmosphere may be provided at a temperature of about 20° to 180°C. during the drying step, and most preferably is provided at a temperature of about 90° to 170°C. (e.g. at a temperature of about 100°C.). The residence time for the drying is inversely related to the temperature of the gaseous atmosphere and commonly ranges from about 50 to 120 seconds. At the upper end of the drying temperature range the non-uniform deposition of the polyether urethane polymer tends to be more tightly fused to the fibrous material. If the drying is conducted at the lower end of the temperature range, then fusion results during the subsequent application of the adhesive, and/or during tire production. Comparable results are achieved regardless of when the fusion takes place. In a particularly preferred embodiment of the process the fibrous material is stretched about 1 to 2 percent during the drying step to enhance its strength retention.

As illustrated in the drawing the resulting deposition of polyether urethane polymer from the dispersion is non-uniform in the sense that a smooth continuous coating of the same is not visible when the surface of the multifilament fibrous material visually is examined at a magnification of 450X. More specifically the resulting deposition tends to assume the appearance of discrete particles as well as an accumulation of the polyether urethane polymer in the crevices between adjoining filaments and adjoining plies. Also, the coating is applied primarily to the exposed surface of the multifilament fibrous material.

An adhesive coating subsequently is applied to the multifilament polyester fibrous material following the application of the fiber finish and the non-uniform deposition of the polyether urethane polymer. The adhesive coating may be applied in accordance with conventional techniques and serves to facilitate bonding between the fibrous material and the rubber matrix. The adhesive coating may be any of the adhesives commonly utilized with polyester tire cord. Representative adhesive systems include (1) the N-3 single dip system wherein triallyl isocyanurate is combined with the ingredients of a conventional RFL adhesive (i.e. a resorcinol/formaldehyde/latex), (2) the D417 double dip system wherein a blocked isocyanate and an epoxy are initially applied followed by a conventional RFL adhesive, and (3) the H-7 single dip system wherein the reaction product of formaldehyde, p-chlorophenol, and resorcinol is used in combination with the conventional RFL adhesive. When the fibrous material has been "adhesive activated" through the prior application of an appropriate fiber finish, only the conventional RFL adhesive need be applied during the adhesive coating step. The exact adhesive selected is not critical to the achievement of the improved service results provided by the present invention. The adhesive coating commonly is applied in a concentration of about 4 to 8 percent by weight of the surface prepared product (i.e., after adhesive drying), and preferably in a concentration of about 4.5 to 6 percent by weight of the surface prepared product.

Multifilament polyester fibrous materials which have been surface prepared in accordance with the present invention may be used in the manufacture of pneumatic tires of conventional design as fibrous reinforcement and substituted for the multifilament polyester fibrous materials heretofore utilized. Standard tire production techniques may be utilized.

It surprisingly has been found that the presence of the non-uniform deposition of the polyether urethane polymer as heretofore described significantly enhances the in-rubber chemical stability in a heated environment of the resulting multifilament polyester fibrous material. More specifically, the multifilament polyester fibrous material exhibits a greater degree of strength retention when incorporated in a rubber matrix at an elevated temperature. The deposition of polyether urethane polymer results in no appreciable enhancement of the bond between the fibrous material and a rubber matrix. The theory whereby the non-uniform deposition of polyether urethane polymer is capable of functioning in this manner is considered to be complex. A greater margin of tire safety is provided under severe operating conditions (e.g. highly elevated temperature conditions). The polyester fiber surprisingly is believed to degrade to a lesser degree during use when incorporated in a rubber tire. The useful life of tires which incorporate the same is extended.

The increased in-rubber chemical stability of the multifilament polyester fibrous material of the present invention when incorporated in a rubber matrix may be demonstrated by conducting a standard press test. A standardized rubber/fiber composite is formed, cured, aged at an elevated temperature, and the fibers tested for strength retention. More specifically, a polyester tire cord consisting of 3 plies of 192 filaments twisted in a 9 × 9 configuration and having a total denier of 1000 per ply is incorporated in uncured Firestone C-1016 rubber as described. Prior to placing the tire cord in rubber all samples are conditioned under identical humidity conditions. A 6 inches × 14 inches composite is formed having 0.15 inch rubber on each side of an 18 epi (ends per inch) layer of the cord. The sample is placed in a mold and then in a platen press at 310°F. The rubber/fiber composite then is subjected to a pressure of 50 psi for 15 minutes in order to cure the rubber. The composite is next aged at 350°F. at a constant pressure of 12.5 psi for 3 hours while still in the press. The composite is removed from the mold and the rubber layers carefully are separated and the cords removed. The breaking strength of aged and unaged cords is determined in an Instron Tester. The percent of strength retention is calculated by dividing the unaged breaking strength into the aged breaking strength times 100.

Typically multifilament polyester fibrous materials of the prior art exhibit a strength retention of about 55 to 60 percent when subjected to the standard test. On the contrary multifilament polyester fibrous materials of the present invention commonly exhibit a strength retention of about 70 to 75 percent.

The following examples are given as specific illustrations of the present invention. It should be understood, however, that the invention is not limited to the specific details set forth in the examples.

EXAMPLE I

A polyethylene terephthalate tire cord having a denier of 1000 per ply and consisting of 3 plies of 192 continuous filaments twisted in a 9 × 9 configuration was selected as the starting material.

A conventional fiber finish incorporating a high molecular weight fatty acid ester was applied to the polyethylene terephthalate filaments in a concentration of about 0.6 percent by weight of the surface prepared product immediately after melt-spinning by contact with a kiss roll.

The polyester tire cord was passed through a vessel containing an aqueous dispersion of polyether urethane polymer of the formula previously indicated wherein Ar was derived from 4,4'-diphenylmethane diisocyanate, Y was a branched chain alkylene group of 3 carbon atoms, and $x$ equaled about five. The recurring units of the polymer were joined by urea linkages derived from a m-phenylene diamine chain extender, and the average molecular weight of polyether urethane polymer was about 70,000. The polyether urethane polymer was present in the aqueous dispersion in a concentration of about 10 percent by weight. Also included in the aqueous dispersion was about 2 percent by weight of a polyethylene glycol nonionic surfactant having a molecular weight of about 10,000, and about 2 percent by weight of toluene. The aqueous dispersion was obtained by the dilution with water of a product commercially obtained from the BSAF Wyandotte Corporation under the designation X-1033G urethane latex.

The aqueous dispersion of polyether urethane polymer was maintained at a temperature of about 23°C. and the polyester cord was in contact therewith for about 1 second. Upon withdrawal of the cord from a vessel containing the aqueous dispersion a coating of the dispersion adhered to the outer surface thereof.

The fibrous material bearing the coating was next dried by passage for 55 seconds through an oven maintained at 93°C. during which time the fibrous material was stretched about 1.5 percent. During the drying treatment the water component of the dispersion was evolved and a non-uniform deposition of the polyether urethane polymer resulted upon the surface of the tire cord similar to that illustrated in the drawing. The non-uniform polymer deposition was accomplished in a concentration of about 4 percent by weight of the surface prepared product.

A conventional N-3/RFL adhesive was next applied in a concentration of about 6 percent by weight of the surface prepared product.

When the resulting polyester tire cord was subjected to the standard press test as heretofore described it was found that it exhibited an enhanced strength retention of 71 percent. In a control test in accordance with the prior art wherein the non-uniform deposition of the polyether urethane polymer was omitted intermediate the finish and adhesive a strength retention of only 59.5 percent was observed. The intermediate processing of the foregoing control test involved the contact of the fibrous material with water rather than the aqueous dispersion of polymer as described. In a further control test the N-3/RFL adhesive was totally omitted and a strength retention of only 56 percent was observed in the standard press test.

EXAMPLE II

Example I was repeated with the exception the polyether urethane polymer dispersion which was contacted with the polyester fibrous material contained the polymer in concentration of about 25 percent by weight. The non-uniform polymer deposition was accomplished in a concentration of about 6 percent by weight of the surface prepared product. Also, a conventional D417/RFL double dip adhesive was applied in a concentration of about 5 percent by weight of the surface prepared product instead of the N-3/RFL adhesive.

When the resulting polyester tire cord was subjected to the standard press test as heretofore described it was found that it exhibited an enhanced strength retention of 72.5 percent. In a control test in accordance with the prior art wherein the non-uniform deposition of the polyether urethane polymer was omitted intermediate the finish and adhesive a strength retention of only 64 percent was observed. The intermediate processing of the foregoing control test involved the contact of the fibrous material with water rather than the aqueous dispersion of polymer as described. In a further control test the D417/RFL adhesive was totally omitted and a strength retention of only 58 percent was observed in the standard press test.

Although the invention has been described with preferred embodiments, it is to be understood that variations and modifications may be resorted to as will be apparent to those skilled in the art. Such variations are to be considered within the purview and scope of the claims appended thereto.

We claim:

1. In a process for the surface preparation of a multifilament polyester fibrous material for incorporation in a rubber tire matrix wherein a fiber finish initially is applied and an adhesive coating subsequently is applied; the improvement of treating the multifilament fibrous material subsequent to the application of said fiber finish and prior the application of said adhesive coating whereby the thermal stability thereof is enhanced during use comprising:

a. contacting said fibrous material with an aqueous dispersion of a polyether urethane polymer having recurring units of the formula:

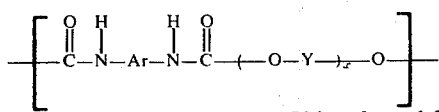

where Ar is an arylene group, Y is selected from the group consisting essentially of an arylene group, a branched chain alkylene group having 2 to 4 carbon atoms, a non-branched chain alkylene group having 2 to 4 carbon atoms, and mixtures of the foregoing, and $x$ = about 4 to 25, with said polyether urethane polymer being present in said aqueous dispersion in a concentration of about 5 to 25 percent by weight whereby at least the outer surface of said fibrous material is coated with said aqueous dispersion, and b. drying said fibrous material bearing said aqueous dispersion in a gaseous atmosphere until the water component of said dispersion substantially is evolved and a non-uniform deposition of said polyether urethane polymer upon at least the outer surface of said fibrous material is accomplished in a concentration of about 1 to 6 percent by weight of the resulting fibrous material.

2. An improved process according to claim 1 wherein said multifilament polyester fibrous material is substantially all polyethylene terephthalate.

3. An improved process according to claim 1 wherein said multifilament polyester fibrous material is a yarn.

4. An improved process according to claim 1 wherein said multifilament polyester fibrous material is a tire cord.

5. An improved process according to claim 1 wherein said Ar is derived from 4,4'-diphenylmethane diisocyanate.

6. An improved process according to claim 1 wherein said Ar is derived from a mixture of 2,4-tolylene diisocyanate and 2,6-tolylene diisocyanate.

7. An improved process according to claim 1 wherein Y is a non-branched chain alkylene group having 2 to 4 carbon atoms.

8. An improved process according to claim 1 wherein Y is a branched chain alkylene group having 2 to 4 carbon atoms.

9. An improved process according to claim 8 wherein said branched chain alkylene group has 2 to 3 carbon atoms.

10. An improved process according to claim 1 wherein said polyether urethane polymer additionally includes urea linkages between said recurring units.

11. An improved multifilament polyester fibrous material for incorporation in a rubber tire matrix which bears a non-uniform deposition of a polyether urethane polymer having recurring units of the formula:

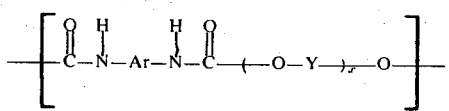

where Ar is an arylene group, Y is selected from the group consisting essentially of an arylene group, a branched chain alkylene group having 2 to 4 carbon atoms, a non-branched chain alkylene group having 2 to 4 carbon atoms, and mixtures of the foregoing, and $x =$ about 4 to 25, intermediate an inner coating of fiber finish and an outer coating of adhesive, with said polyether urethane polymer being present in a concentration of about 1 to 6 percent by weight of the resulting fibrous material and serving to enhance the thermal stability thereof during use.

* * * * *